United States Patent [19]

Matsuoka

[11] Patent Number: 5,111,346
[45] Date of Patent: May 5, 1992

[54] FM AUDIO RECORD REPRODUCING APPARATUS HAVING CIRCUITRY FOR PREVENTING DISCONTINUITIES DURING CHANNEL SWITCHING OR SWITCHING OF READ HEADS

[75] Inventor: Hideo Matsuoka, Tokyo, Japan
[73] Assignee: Akai Electric Co., Ltd., Tokyo, Japan
[21] Appl. No.: 381,248
[22] Filed: Jul. 18, 1989

[30] Foreign Application Priority Data

Jul. 20, 1988 [JP] Japan ................. 63-180665

[51] Int. Cl.$^5$ ............... G11B 15/14; G11B 5/02; G11B 20/06
[52] U.S. Cl. .................. 360/64; 360/30; 360/19.1
[58] Field of Search ............... 360/64, 19.1, 20, 21, 360/30

[56] References Cited

U.S. PATENT DOCUMENTS 4,669,002 5/1987 Nishioka et al. ............. 360/64
4,692,914 9/1987 Yasumura et al. ............ 360/64

FOREIGN PATENT DOCUMENTS

60-253005 12/1985 Japan .
61-51602 3/1986 Japan .
61-139966 6/1986 Japan ...................... 360/64

Primary Examiner—Aristotelis Psitos
Assistant Examiner—Varshav Sheladia
Attorney, Agent, or Firm—Stevens, Davis, Miller & Mosher

[57] ABSTRACT

A reproducing apparatus which is provided with: frequency converting means for performing frequency conversion of the FM regenerative signals respectively from the read heads, on the basis of frequency conversion signals each having a frequency different from the frequency of the carrier; voltage-controlled oscillators for generating the frequency conversion signals, respectively; phase comparators for comparing phases of two FM regenerative signals frequency-converted by the frequency converting means in the overlap period so as to produce a difference signal corresponding to the difference between the phases; switching circuits for feeding the difference signal generated by the phase comparators, into one of the voltage-controlled oscillators generating the frequency conversion signal for frequency conversion of succeedingly reproduced one of the FM regenerative signals in the overlap period; and loop filters for stabilizing a loop system constituted by the aforementioned parts; whereby the phases of two frequency-changed FM regenerative signals are made to coincide with each other before the switching of the output in the overlap period.

17 Claims, 5 Drawing Sheets

FM AUDIO RECORD REPRODUCING APPARATUS HAVING CIRCUITRY FOR PREVENTING DISCONTINUITIES DURING CHANNEL SWITCHING OR SWITCHING OF READ HEADS

FIELD OF THE INVENTION

The present invention relates to an apparatus for reproducing an FM audio record through a helical scanning system.

BACKGROUND OF THE INVENTION

Recently, with the advance in making video sound high-fidelity and with the change of video sound from monaural to stereo or bilingual, the frequency bandwidth of audio signals has been expanded and high-quality transmission system has been required.

To satisfy such a requirement, there has been proposed an audio recording system of a video tape recorder (VTR) in which an audio signal is recorded in the form of an FM audio signal through a helical scanning recording system using a plurality of write heads in the same manner as video signal recording, besides a conventional audio recording system in which an audio signal is recorded simply continuously in an audio track in parallel to the running direction of a tape.

For example, the proposed recording system is mainly classified into two types, namely, a VHS type and a beta-format or 8 mm video type. The VHS type recording system has audio-exclusive heads and video-exclusive heads so that an FM audio signal recorded in a deep layer portion of magnetic recording layers of a tape by use of the audio-exclusive heads and then a video signal is recorded in a shallow layer portion of the tape by use of the video-exclusive heads. The beta-format or 8 mm video type recording system has video heads by which a video signal and an FM audio signal are recorded at once in the form of a composite signal.

Figure 6:
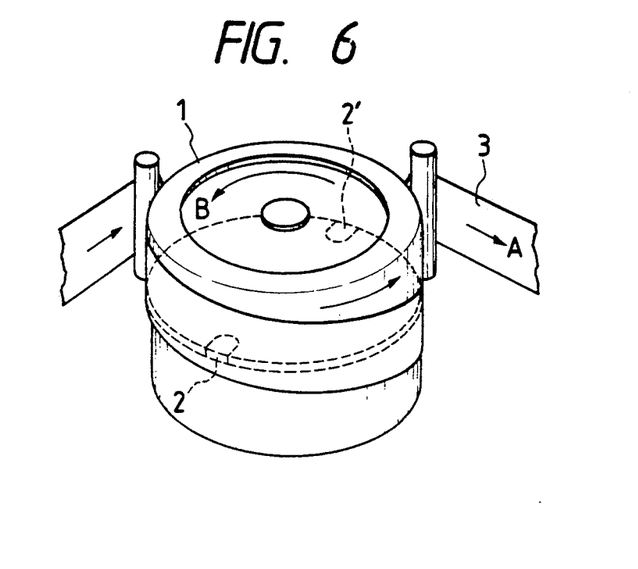
FIG. 6 is a perspective view showing the relative positions of the heads and the tape in the reproducing apparatus as a subject of the present invention.

In either systems, as shown in FIG. 6, an FM audio signal is recorded by use of two read-write heads 2 and 2' on a tape 3 running in the direction of the arrow A while the tape 3 is wound on a rotary drum 1 helically over a half round thereof, the rotary drum 1 rotating in the direction of the arrow B. The read-write heads 2 and 2' are provided on the rotary drum 1 in positions separated by 180° from each other and being symmetrical with respect to the rotational axis of the rotary drum 1. The heads 2 and 2' shown in FIG. 6 are heads related to audio, that is to say, video-exclusive heads are not shown even in the case such video-exclusive heads are provided.

Figure 7:
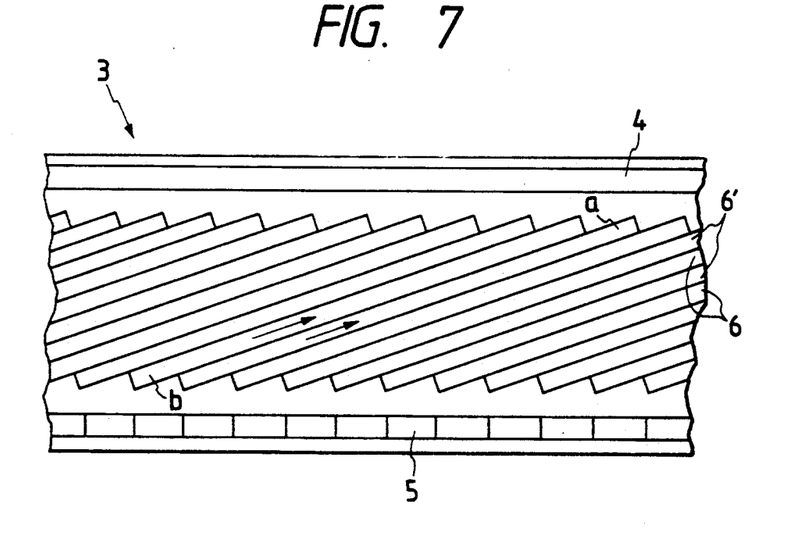
FIG. 7 is a development view visually showing signals recorded on the tape thereof.

FIG. 7 is a view showing visually signals recorded on the tape 3, seen from the base surface of the tape.

In the drawing, an audio track 4 records thereon an audio signal simply and continuously, and a control track 5 controls tracking of the rotary heads.

An FM audio signal is divided into parts each equivalent to one field (1/60 seconds in the case of NTSC) of video signal. The parts are recorded, by use of the heads 2 and 2', on FM audio tracks 6 and 6' obliquely relative to the running direction of the tape 3. The FM audio tracks 6 and 6' adjacent to each other are constructed so that a backward end portion a of a preceding track and a forward end portion b of a succeeding track overlap each other by about 5%.

Figure 8:
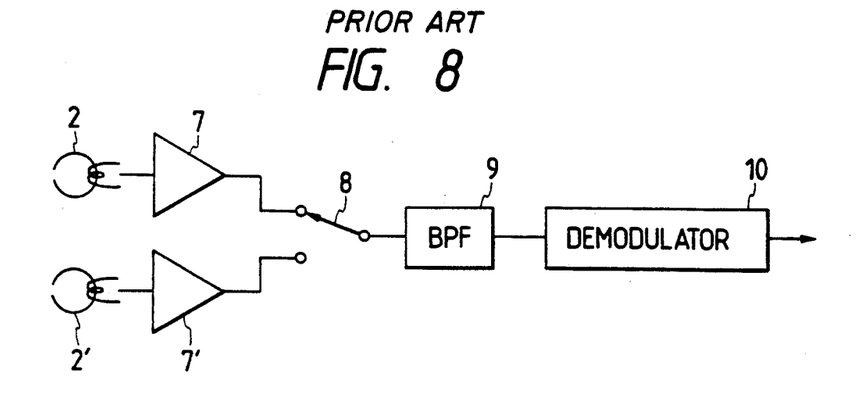
FIG. 8 is a block diagram showing an example of conventional reproducing apparatus.

FIG. 8 is a block diagram showing an example of a conventional apparatus for reproducing a continuous audio signal from such an FM audio signal recorded as described above.

The heads 2 and 2' are respectively connected in series to pre-amplifiers 7 and 7' to form two channels CH1 and CH2. The output signals of the pre-amplifiers 7 and 7' are respectively fed to a changeover switching circuit 8, for example, constituted by an analog multiplexer.

Assuming now tha the head 2 of the channel CH1 puts out an FM regenerative signal, then the FM regenerative signal is amplified by the pre-amplifier 7 and fed to the changeover switching circuit 8.

The changeover switching circuit 8 is constructed to switch over to a signal regenerative channel (hereinafter referred to as "live channel"). Accordingly, the signal of the channel CH1 is passed through the changeover switching circuit 8. Then, unnecessary part of the signal such as a video signal mixed therein or a noise is cut off by a band-pass filter (hereinafter referred merely to "BPF") 9. Then, only an FM audio signal is demodulated by the demodulator 10 so that an audio signal is outputted.

When the head 2' of the other channel CH2 then outputs an FM regenerative signal, on the contrary, the changeover switching circuit 8 is operated to switch over to the channel CH2. (Hereinafter, the channel having no signal output is referred to as "dead channel", and the dead channel starting signal output is referred to as "following channel".)

The aforementioned procedures are repeated alternately, so that audio signals thus demodulated are put out in the form of a continuous signal.

Although the relative positions (of symmetry) of the heads 2 and 2' on the rotary drum as shown in FIG. 6 may be produced with high accuracy, it is impossible to avoid a little phase difference of FM regenerative signal caused by factors, such as: a difference between the head positions at recording time and at reproducing time caused by a slight manufacturing tolerance; expansion and contraction of the tape caused by changes in temperature, in humidity, and in time aging; expansion and contraction of the rotary drum; a difference in lagging between the circuits; and the like.

Figure 9:
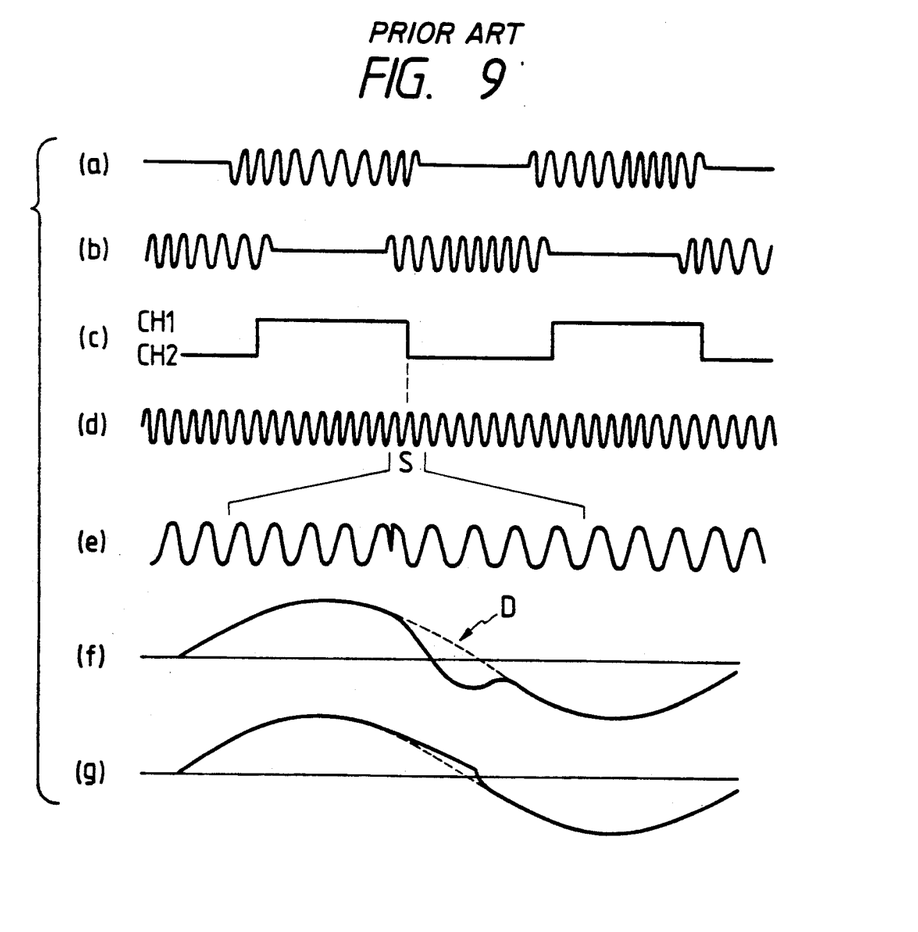
FIG. 9 is a timing chart showing the signals and the operations of the switching circuits of the conventional reproducing apparatus.

Therefore, a phase difference occurs between the FM regenerative signals of the channels CH1 and CH2 as shown in FIG. 9, so that a discontinuous portion is produced in the waveform of the FM audio signal by the switching operation of the changeover switching circuit 8.

In FIG. 9, the diagrams (a) and (b) show waveforms of FM audio signals outputted from the channels CH1 and CH2, respectively. By switching the changeover switching circuit 8 in an overlap period as shown in the diagram (c), the waveform of a continuous FM audio signal as shown in the diagram (d) can be obtained.

However, slight phase differences in the waveform of the signals shown in the diagrams (a) and (b) of FIG. 9 are caused by jitter. If the time axis in the vicinity of the switching points S as related to the waveform of the signal shown in the diagram (d) is enlarged, a discontinuous portion of the waveform of the signal caused by the switching can be observed as shown in the diagram (e).

In the rear of the discontinuous portion, the fequency is shifted by a period determined by the bandwidth of the BPF 9.

Accordingly, if the signal is demodulated into an audio signal by the demodulator 10, disorder D is produced in the waveform of the audio signal as shown in the diagram (f) of FIG. 9.

To prevent the disorder of the waveform of the audio signal, a measure of temporarily storing the level of the waveform of the demodulated audio signal or temporarily holding the linear differential value thereof as shown in the diagram (g) of FIG. 9 before the procedure is shifted to the demodulated signal of the channel CH2 has been proposed. However, the problem in discontinuity of the waveform could not be solved prefectly.

Whenever the respective head is changed over, discontinuity occurs in a predetermined period (60 times per second in the case of NTSC). In the case of complex-waveform sounds such as a percussive sound, an orchestra sound and a consonant sound, the discontinuity becomes inconspicuous. However, in the case where simple-waveform sounds near to pure sounds such as a wind sound, an organ sound and a vowel sound (particularly, "a" and "o") are continued, the continuity becomes conspicuous as noise.

SUMMARY OF THE INVENTION

In such circumstances, it is therefore an object of the present invention to prevent the occurrence of a discontinuous portion of the waveform of a FM audio signal caused by the channel switching operation when the FM audio signal is reproduced through a helical scanning system to thereby remove noises of the audio signal caused by the discontinuity of the waveform.

Another object of the present invention is to provide an improvement in a helical scanning system FM audio record reproducing apparatus, in which phase-locked loop circuits are operated in a period of overlap of FM regenerative signals to make the phases of the FM regenerative signals coincide with each other to thereby prevent production of a discontinuous portion of an FM audio signal waveform caused by switching of read heads and, accordingly, to thereby remove noises in the audio signal caused by the discontinuous portion of the waveform.

To attain the foregoing objects, according to the present invention, the aforementioned reproducing apparatus is provided with: frequency converting means for performing frequency conversion of the FM regenerative signals respectively from the read heads, on the basis of frequency conversion signals each having a frequency different from the frequency of the carrier; voltage-controlled oscillators for generating the frequency conversion signals, respectively; phase comparators for comparing phases of two FM regenerative signals frequency-converted by the frequency converting means in the overlap period so as to produce a difference signal corresponding to the difference between the phases; switching circuits for feeding the difference signal generated by the phase comparators, into one of the voltage-controlled oscillators generating the frequency conversion signal for frequency conversion of succeedingly reproduced one of the FM regenerative signals in the overlap period; and loop filters for stabilizing a loop system constituted by the aforementioned parts; whereby the phase of two frequency-changed FM regenerative signals are made to coincide with each other before the switching of the output in the overlap period.

In the above configuration of the invention, the following channel side switching circuit is turned on in the overlap period to form a phase-locked loop circuit composed of a voltage-controlled oscillator, a frequency converting means, a phase comparator and a loop filter to thereby make the phase of the frequency-changed FM regenerative signal of the following channel coincide with the phase of the frequency-changed FM regenerative signal of the live channel before channel switching. Accordingly, the waveform of the FM audio signal received in the demodulator becomes continuous without occurrence of such a discontinuous portion in spite of channel switching. Consequently, noises caused by such a discontinuous portion of the waveform of the FM audio signal is never produced in the demodulated audio signal.

DESCRIPTION OF THE PREFERRED EMBODIMENTS

Preferred embodiments of the present invention will be described in detail with reference to accompanying drawings.

Figure 1:
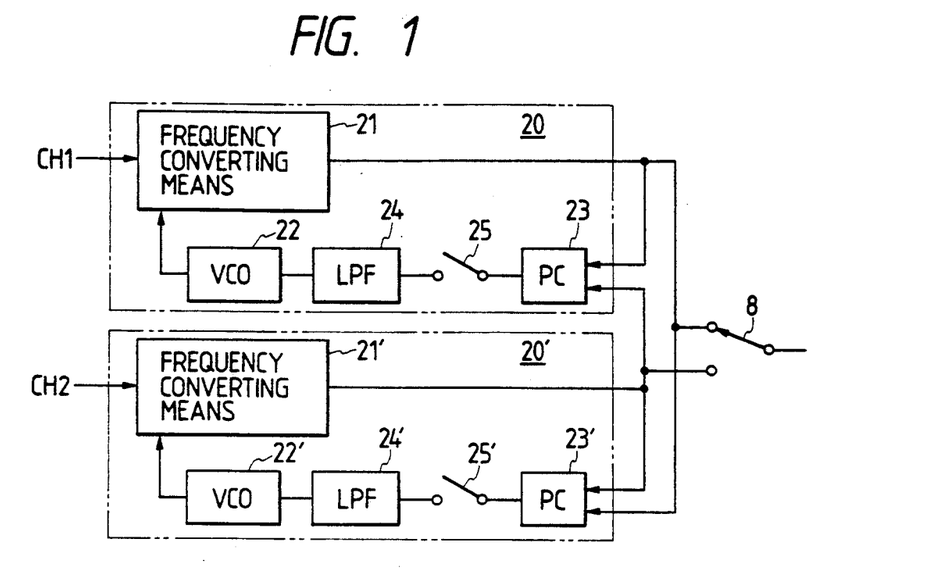
FIG. 1 is a block diagram showing the basic congfiguration of a first embodiment of the present invention.

FIG. 1 is a block diagram showing the basic configuration of a first embodiment of the present invention. In FIG. 1, phase lock loop circuits (hereinafter abbreviated to "PLLs") 20 and 20' are respectively provided just prior to the changeover switching circuit 8 to which FM regenerative signals of the channels CH1 and CH2 reproduced through two heads disposed on rotary drum in positions separated by 180° from each other, as shown in FIG. 8, and then amplified are fed.

The PLL 20 comprises a frequency converting means 21, a voltage-controlled oscillator (hereinafter abbreviated to "VCO") 22, a phase comparator 23, and a low-pass filter (hereinafter abbreviated to "LPF") 24 as a loop filter. The PLL 20 serves to make the phases of two signals coincide with each other. The PLL 20 is different from a general PLL in that a switching circuit 25 is disposed between the phase comparator 23 and the LPF 24. The switching circuit 25 is constituted by an analog electronic switching circuit for controlling the timing to operate the PLL 20.

The other PLL 20' of the channel CH2 is configured in the same manner as the PLL 20.

The switching circuits 25 and 25' are usually opened but one in the following channel receiving an FM regenerative signal succeedingly is closed in an overlap period in which the two channels receive FM regenerative signals simultaneously. Accordingly, the following channel side PLL is formed and operates to make the phase of the following channel side singal coincide with of the phase the live channel side signal.

Figure 2:
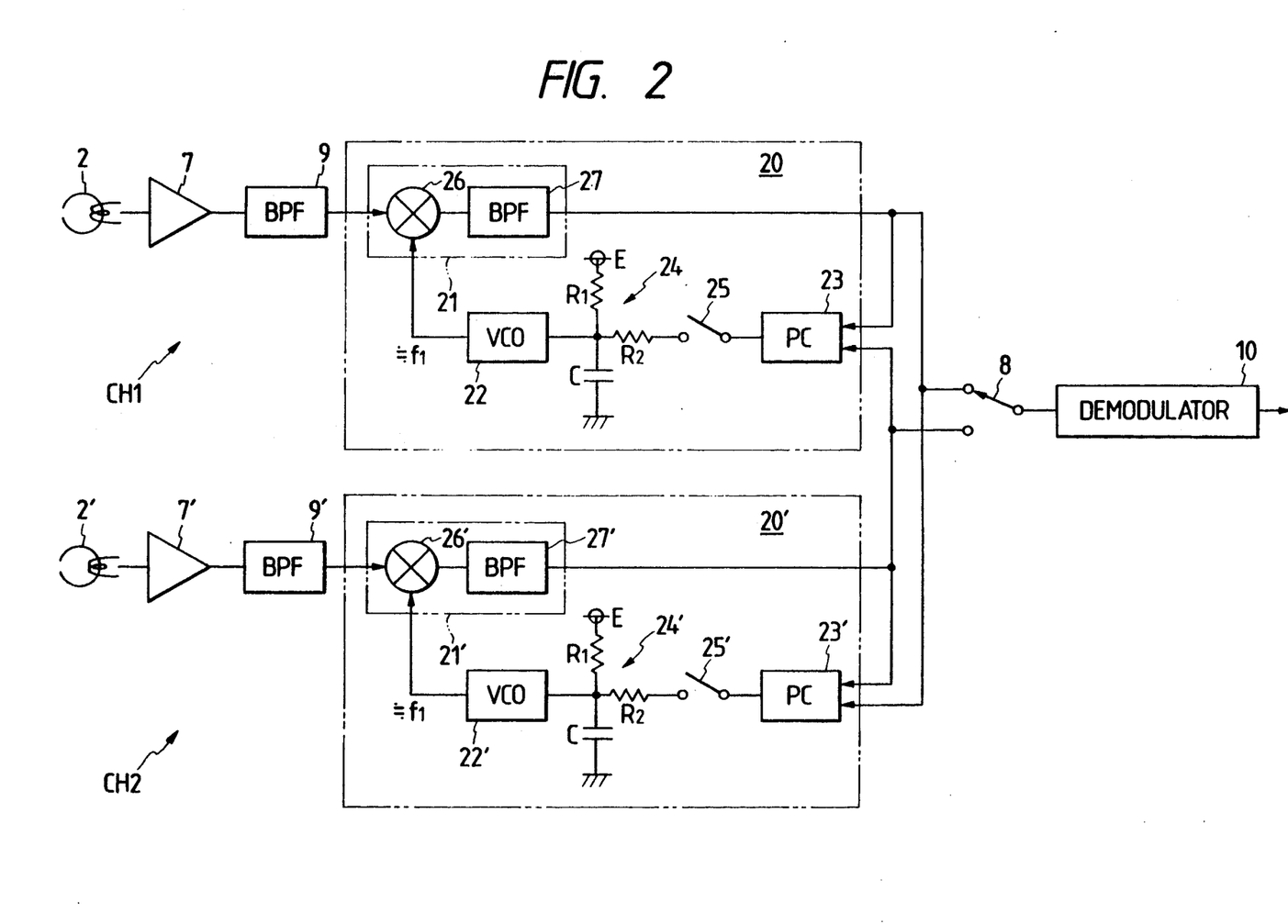
FIG. 2 is a circuit diagram showing a specific configuration the embodiment.

FIG. 2 is a circuit diagram showing a specific example of the embodiment shown in FIG. 1.

FM regenerative signals reproduced from a recording medium (such as for example a ½ inch mangnetic video tape) through the heads 2 and 2' are FM audio signals formed by frequency modulation (frequency deviation: ±50 kHz) of a carrier having a frequency $f_o$ (for example, 1.4 MHz) on the basis of an audio signal at the time of recording. The FM regenerative signals are amplified by pre-amplifier 7 and 7' and passed through BPFs 9 and 9' so as to be put out, respectively.

Each of the thus amplified FM regenerative signals contains am FM audio signal, a video signal composed of a luminance signal (frequency band: 3.4 MHz–4.4 MHz) and a low-frequency transformed color signal (conversion frequency: 630 kHz), and noises. Each of the BPFs 9 and 9' cuts off the video signal and noises to separate the FM audio signal around the carrier frequency $f_0$.

Each of the LPFs 24 and 24' comprises a capacitor C, and resistors R1 and R2. The capacitor C, and the resistors R1 and R2 are connected to a common junction point at their one ends. The opposite end of the capacitor C is grounded, the opposite end of the resistor R1 is connected to a reference voltage E, and the opposite end of the resistor R2 is connected to an output terminal of the switching circuit 25. The common junction point is connected to an input terminal of the VCO 22.

Each of the VCOs 22 and 22' generates a reference frequency $f_1$ (for example, 1 MHz) for the frequency conversion signal when the voltage at the input terminal thereof is equal to the reference voltage E.

For example, the frequency converting means 21 of the channel CH1 comprises a modulator 26 and a BPF 27 connected in series.

The modulator 26 receives both the FM audio signal put out from the BPF 9 and the frequency conversion signal put out from the VCO 22 and performs amplitude-modulation of the FM audio signal on the basis of the frequency conversion signal to thereby obtain a double side-band wave having a frequency deviation around the frequency $(f_0+f_1)$ and the frequency $(f_0-f_1)$. The BPF 27 serves to obtain an FM signal having a center frequency $(f_0+f_1)$ which is of the upper side-band wave in the double side-band wave received from the modulator 26.

Accordingly, the frequency converting means 21 produces an FM audio signal formed by frequency conversion of the FM audio signal of the channel CH1, as a regenerative signal, to increase the frequency thereof by a frequency $(|f_1)$ generated from the VCO 22.

Similarly, the frequency converting means 21' of the channel CH2 comprises a modulator 26' and a BPF 27'. The modulator 26' receives both the FM audio signal put out from the BPF 9' and the frequency conversion signal put out from the VCO 22', so that the BPF 27' puts out an FM audio signal formed by frequency conversion of the FM audio signal of the channel CH2, as a regenerative signal, to increase the frequency thereof by a frequency $(|f_1)$ generated from the VCO 22'.

The frequency-converted FM audio signals thus put out from the frequency converting means 21 and 21' of the channels CH1 and CH2 are fed to two input terminals of the changeover switching circuit 8 and respective two input terminals of the phase comparators 23 and 23'.

Because FM audio signals put out from the PLLs 20 and 20' are fed to the respective two input terminals of the phase comparators 23 and 23' in the reversed order, one phase comparator 23 generates a voltage higher or lower than the reference voltage E correponding to the state whether the phase of the FM audio signal of the channel CH1 is ahead or behind relative to the channel CH2 and, similarly, the other phase comparator 23' generates a voltage higher or lower than the reference voltage E corresponding to the state whether the phase of the FM audio signal of the channel CH2 is ahead or behind relative to the channel CH1.

When the phases of the frequency-converted FM audio signals of the two channels coincide with each other, the output voltages of the phase comparators 23 and 23' are both equal to the reference voltage E.

A rotation position sensor not shown is provided on the shaft of the rotary drum 1 as shown in FIG. 6. The rotation position sensor generates signals corresponding to the positions of the heads 2 and 2' so that the positions of the heads 2 and 2' can be classified into three, namely, a live position, a dead position and a following position which mean the head positions when the channel containing the head is a live channel, a dead channel and a following channel, respectively.

The switching circuits 25 and 25' and the changeover switching circuit 8 shown in FIGS. 1 and 2 operate respectively corresponding to the output signal of the rotation position sensor.

Figure 3:
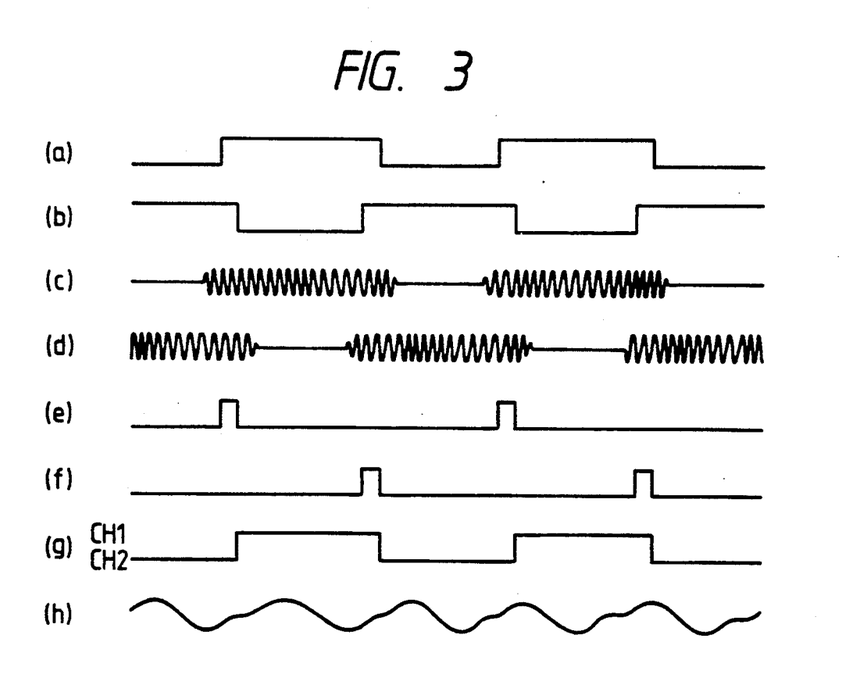
FIG. 3 is a timing chart showing signals and the operations of sweitching circuits in the embodiment.

FIG. 3 is a timing chart showing the respective signals and the operations of the switching circuits. In FIG. 3, the diagrams (a) and (b) show output signals of the rotation position sensor showing the state whether the heads 2 and 2' are in the signal regenerative position or not. The diagrams (c) and (d) show an example of the waveforms of FM audio signals fed to the PLLs 20 and 20' of the channels CH1 and CH2, respectively. The diagrams (e) and (f) show the ON-OFF state of the switching circuits 25 and 25', respectively. The diagram (g) shows the changeover state of the changeover switching circuit 8. The diagram (h) shows an example of the waveform of an audio signal demodulated by the demodulator 10.

As shown in FIG. 3, the switching circuit 25 is turned on corresponding to the rising of the position signal of the head 2 and turned off corrseponding to the falling of the position signal of the head 2'.

The operation of the switching circuit 25' is the same as the operation of the switching circuit 25.

The changeover switching circuit 8 serves to change the channel containing the head over to the other channel corresponding to the falling of the position signal in each of the heads 2 and 2'. Accordingly, the following channel is changed to the live channel and the live channel to the dead channel.

Figure 4:
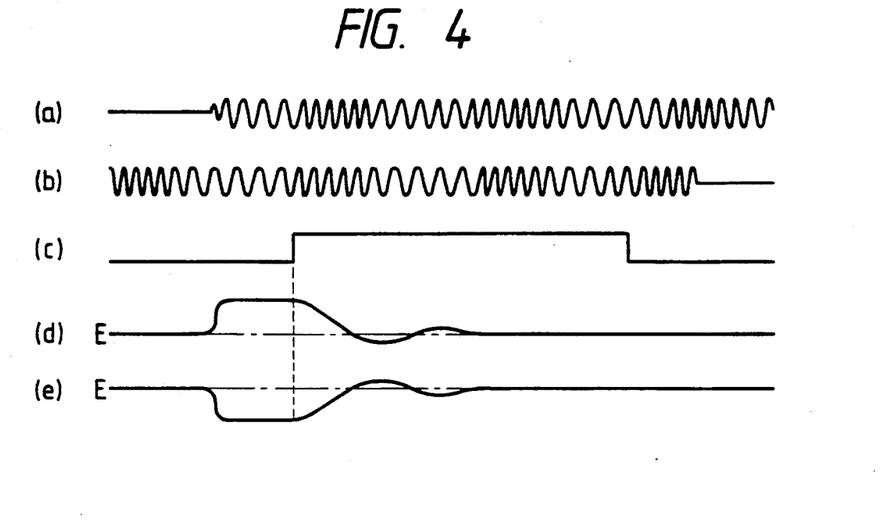
FIG. 4 is a timing chart showing the changeover portion of the switching circuits with enlarged time axis of FIG. 3.

FIG. 4 is a timing chart showing a channel changeover portion with enlarged the time axis (abscissa) of the timing chart shown in FIG. 3.

In FIG. 4, the diagrams (a) and (b) show an example of the waveforms of the signals put out from the PLLs 20 and 20' of the channels CH1 and CH2, respectively. The signals shown in the diagrams (a) and (b) of FIG. 4 are respectively equivalent to signals after frequency conversion of the signals shown in the diagrams (c) and (d) of FIG. 3. In FIG. 4, the diagram (c) shows the ON-OFF state of the switching circuit 25 of the channel CH1 and is equivalent to the diagram (e) in FIG. 3. In FIG. 4, the diagrams (d) and (e) show an example of the waveforms of output voltages of the phase comparators 23 and 23' of the channels CH1 and CH2, respectively.

Because the phase difference between the FM regenerative signals is about 150 ns in the sense of time, the influence of the difference on the phase of the audio signal (upper limit of the frequency: 10 kHz − 20 kHz) can be neglected. However, a phase difference occurs in the waveform of the FM carrier ($f_0 = 1.4$ MHz) and the frequency-converted FM audio signal ($f|2.4$ MHz), so that the discontinuous portion of the waveform of the FM audio signal caused by the switching operation of the changeover switching circuit 8 appears as disorder of waveform of the demodulated audio signal as explained above.

In the following, the operations of the PLLs 20 and 20' in FIG. 2 are described with reference to FIG. 4.

Let the channels CH1 and CH2 be a dead channel and a live channel, respectively. Because both the switching circuits 25 and 25' are in the off-state, both the input voltages of the VCOs 22 and 22' are equal to the reference voltage E. Accordingly, the frequency of the frequency conversion signal generated from each of the VCOs 22 and 22' is equal to the reference frequency $f_1$.

Because the PLL 20' of the channel CH2 receives an FM regenerative signal, an FM audio signal having the center frequency converted into $(f_0+f_1)$ is put out from the BPF 27'. On the contrary, because the channel CH1 is a dead channel, there is no output signal of the BPF 27.

When any one of the input signals of the phase comparators 23 and 23' is zero, both the output voltages thereof are equal to the reference voltage E similarly to the case where the phases of the input signals coincide with each other.

When a signal is obtained through the head 2 of the channel CH1 and passed through the pre-amplifier 7 and the BPF 9 to the PLL 20, the channel CH1 is changed from a dead channel to a following channel.

The phase comparators 23 and 23' compare the frequency converted FM audio signals put out from the BPFs 27 and 27' to thereby shift the output voltages reversely to each other to be higher or lower than the reference voltage E corresponding to the state whether the phase of the following channel CH1 is ahead or behind the phase of the live channel CH2.

When the switching circuit 25 of the following channel CH1 is then turned on, the output voltage of the phase comparator 23 is applied to the input terminal of the VCO 22 through the LPF having a time constant determined by the parallel resistance of the resistors R1 and R2 and the capacitance of the capacitor C, so that the voltage thereof is shifted by a shift value (difference signal corresponding to the leading/lagging phase of the following channel CH1) of the output voltage of the phase comparator 23 from the reference voltage E.

Accordingly, the frequency of the frequency conversion signal generated by the VCO 22 is shifted from the reference frequency $f_1$ so that the phase of the following channel CH1 and the phase of the live channel CH2 coincide with each other. Accordingly, the frequency-converted FM audio signal put out from the BPF 27 of the frequency converting means 21 is shifted by the shift value of the frequency conversion signal, so that the phase thereof approaches the phase of the live channel CH2.

When the phases approach to each other, the output voltages of the phase comparators 23 and 23' are returned reversely to each other to be the reference voltage E, so that the phases of the signals of the channels CH1 and CH2 coincide with each other.

Because the center frequency of the frequency-converted FM audio signals is relatively high (for example, 2.4 MHz), the time required for coincidence of the phases thereof is relatively sufficiently short compared with the overlap period (for example, 0.8 ms).

At the same time the switching circuit 25 of the channel CH1 shown in the diagram (c) of FIG. 4 is turned off, the changeover switching circuit 8 is changed over to switch the channel CH1 to a live channel. Because the phases of the frequency-converted FM audio signals shown in the diagrams (a) and (b) of FIG. 4 coincide with each other up to this point of time, discontinuity in the waveform of the input signal of the demodulator 10 caused by the switching operation of the changeover switching circuit 8 does not occur so that disorder of waveform, that is, noises, caused by the switching operation is not produced in the demodulated audio signal.

Although the description has been applied to the case where the channel CH2 is charged over to the channel CH1, the same rule can be applied to the case where the channel CH1 is changed over to the channel CH2.

The demodulator 10 as shown in FIGS. 1 and 2 is adjusted to the center frequency $(f_0+f_1)$, so that the demodulator is the same as the conventional demodulator 10 adjusted to the center frequency $f_0$ except that they are different in the center frequency.

Although the embodiment in FIG. 2 has shown the case where the PLLs 20 and 20' of the channels CH1 and CH2 are the same in configuration, it is to be understood that the invention is not limited to the specific embodiment and that the two phase comparators may be replaced by one phase comparator as long as the VCOs 22 and 22' can be combined complementarily so that the frequencies of the frequency conversion signals generated by the VCOs 22 and 22' are shifted reversely to each other (one frequency being shifted to be higher, the other being shifted to be lower) when the input voltages thereof are shifted to be higher than the reference voltage E.

Figure 5:
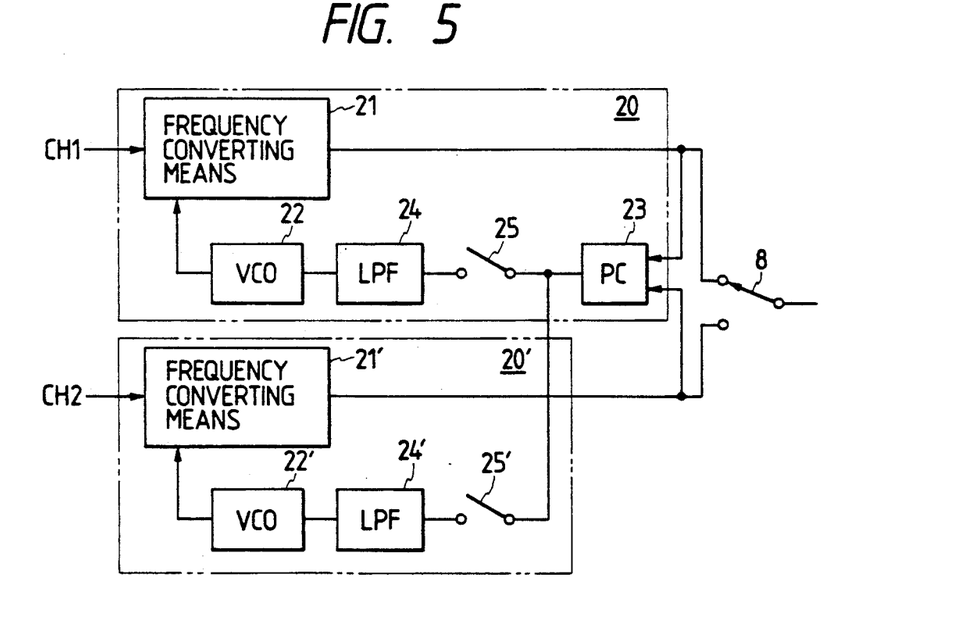
FIG. 5 is a block diagram similar to FIG. 1 and showing a second embodiment of the present invention.

For example, as shown in FIG. 5, the output terminal of one phase comparator 23 may be connected to both the switching circuits 25 and 25' to give the same signal to the switching circuits. In this case, the switching circuits 25 and 25' are never turned on at once, so that the PLLs 20 and 20' operate normally without interference with each other.

Although the embodiment has shown the case where the FM audio record reproducing apparatus according to the invention is applied to monaural, it is a matter of course that the invention can be applied to multichannel reproducing apparatus such as stereo, binaural (stereo in the case where the left and right sounds of the two channels are independently fed to the left and right ears by earphones or the like), bilingual, 3 channels, 4 channels, and the like.

For example, as used in stereo FM broadcasting, in the case where the respective audio signals of the left and right channels are converted into a sum signal and a difference signal by a matrix circuit, a signal obtained by modulating a carrier having a low frequency of about 38 kHz with the difference signal is synthesized with the sum signal to form an audio frequency (AF) signal, an FM aural signal obtained by FM-modulating the carrier having the frequency $f_0$ with the AF signal, the FM aural signal is recorded, and the thus recorded FM aural signal is reproduced, it will do to demodulate the recorded signal into the AF signal by means of the circuit shown in the aforementioned embodiment and then reversely convert the AF signal to separate it into left and right channels by means of the matrix circuit.

Further, in the case where two carriers having different frequencies (for example, 1.4 MHz and 1.6 MHz) respectively are frequency-modulated separately in the left and right channels, the two FM signals are synthesized into one signal, the synthesized signal is recorded, and then the recorded signal is reproduced, it will do to provide a pair of circuits as shown in the embodiment after the regenerative signals obtained from the heads 2 and 2' of the channels CH1 and CH2 through the preamplifiers 7 and 7' are passed through two BPFs and separated into left and right channels.

Further, only one PLL suffices for the purpose if the BPFs 9, 9', 27 and 27' are widened in its band-width, the phases of the regenerative signals are adjusted by the circuits shown in the embodiment so as to form continuous signals through the changeover switching circuit 8 respectively and then the continuous signals are demodulated individually by two demodulators having different center frequencies.

Furthermore, the invention can be applied to a helical scanning system in which the number of heads on the rotary drum is three or more.

Although exclusive PLLs may be respectively provided for a plurality of heads so that the changeover switching circuit can switch from the live channel to the following channel successively to feed a continuous signal to the demodulators, regenerative signals from the plurality of heads can be processed in the same manner as described above by use of at least two PLLs if a multiplexer is provided prior to the input terminals of the PLLs to selectively switching between the live channel and the dead channel as a following channel.

Although the embodiment has shown the case where the invention is applied to an audio record reproducing system of VTRs, it is a matter of course that the invention can be applied to audio tape recorders of exclusive use.

As described above, according to the present invention, when regenerative signals from a plurality of heads in a helical scanning system FM audio record reproducing apparatus are successively switched from the live channel to the following channel to form a continuous FM audio signal, noises caused by discontinuity in the waveform of the FM audio signal does not occur in the demodulated signal. Accordingly, a clear sound near a pure sound which has been difficult to obtain can be reproduced without noises.

What is claimed is:

1. An FM audio signal reproducing apparatus in which an FM audio signal frequency-modulated with a frequency of a carrier signal as its center frequency and recorded on a recording medium by a helical scanning recording system having a plurality of recording heads is reproduced from said recording medium by a helical scanning reproducing system having a plurality of reproducing heads, and said FM signals reproduced by said reproducing heads are successively switched over in a period of overlap of said signals to form a continuous signal which is demodulated into an audio signal so as to be output, said apparatus comprising:

a first reproducing head for producing a first FM signal;

a second reproducing head for producing a second FM signal;

a phase locked loop circuit means for shifting a phase of one of said first and second FM signals to coincide with the other of said first and second FM signals during said overlap period, said phase locked loop circuit means outputting first and second outputs;

a switch means for alternately selecting said first and second outputs of said phase locked loop circuit means to produce said continuous FM signal; and a demodulator for demodulating said continuous FM signals to obtain said audio signal, wherein said phase locked loop circuit means comprises:

a first and a second frequency conversion means for converting a frequency of said FM signal reproduced by said respective reproducing heads, said first and second frequency conversion means outputting a first and a second output signal, respectively; and first and second shifting means for shifting said phase of said first and second output signals of said first and second frequency conversion means, respectively, to coincide with each other on the basis of said first and second outputs of said frequency conversion means, said first and second shifting means outputting a frequency conversion signal to said first and second frequency conversion means for converting a frequency of successively reproduced first and second FM signals, respectively, during said overlap period.

2. The FM audio signal reproducing apparatus of claim 1, wherein each of said first and second shifting means comprises:

a phase comparator for comparing said phases of said first and second outputs of said first and second frequency conversion means, said phase comparator producing a differential signal representing the difference in phase between said first and second outputs of said first and second frequency conversion means; and a voltage-controlled oscillator for generating said frequency conversion signal on the basis of said differential signal produced by said phase comparator, said voltage-controlled oscillator supplying said frequency conversion signal to said respective frequency conversion means.

3. The FM audio signal reproducing apparatus of claim 2, wherein each of said shifting means further comprises a switching circuit for feeding said differential signal generated by said phase comparator to said voltage-controlled oscillator during said overlap period.

4. The FM audio signal reproducing apparatus of claim 2, wherein each of said shifting means further comprises a loop filter for stabilizing a loop system comprising said frequency conversion means, said phase comparator, a switching circuit and said voltage-controlled oscillator.

5. The FM audio signal reproducing apparatus of claim 2, wherein each of said first and second frequency conversion means comprises a modulator and a band pass filter connected in series, said modulator receiving both said FM signal reproduced by said head and said frequency conversion signal generated by said shifting means and performing amplitude-modulation of said FM signal on the basis of said frequency conversion signal thereby obtaining a double side-band wave having a frequency deviation around the frequency $(f_0+f_1)$ and the frequency $(f_0-f_1)$, and said band pass filter obtaining an FM signal having a center frequency $(f_0+f_1)$ which is of the upper side-band wave in the double side-band wave received from said modulator.

6. The FM audio signal reproducing apparatus of claim 4, wherein said loop filter comprises a capacitor and first and second resistors connected to a common junction point at one of their ends, and an opposite end of said capacitor being grounded, an opposite end of said first resistor being connected to a reference voltage, an opposite end of said second resistor being connected to an output terminal of said phase comparator, and said common junction point being connected to an input terminal of said voltage-controlled oscillator.

7. The FM audio signal reproducing apparatus of claim 1, wherein said first shifting means comprises:
a phase comparator for comparing said phases of said first and second outputs of said first and second frequency conversion means, said phase comparator producing a differential signal representing the difference in phase between said first and second outputs of said first and second frequency conversion means; and
a first voltage-controlled oscillator for generating a first frequency conversion signal on the basis of said differential signal produced by said phase comparator, said voltage-controlled oscillator supplying said first frequency conversion signal to said first frequency conversion means; and
said second shifting means comprises:
a second voltage-controlled oscillator for generating a second frequency conversion signal on the basis of said differential signal produced by said phase comparator of said first shifting means, said voltage-controlled oscillator supplying said second frequency conversion signal to said second frequency conversion means,
wherein said first and second voltage-controlled oscillators are combined complementarily whereby the frequencies of said frequency conversion signals generated by said first and second oscillators are shifted reversely relative to each other.

8. The FM audio signal reproducing apparatus of claim 3, wherein said switching circuit comprises an analog electronic switching circuit.

9. The FM audio signal reproducing apparatus of claim 1, wherein said reproducing apparatus is a VHS-type apparatus.

10. The FM audio signal reproducing apparatus of claim 1, wherein said reproducing apparatus has a beta-format.

11. The FM audio signal reproducing apparatus of claim 1, wherein said reproducing apparatus is an 8 mm video type apparatus.

12. The FM audio signal reproducing apparatus of claim 1, wherein said reproducing apparatus is a multi-channel reproducing apparatus.

13. The FM audio signal reproducing apparatus of claim 12, wherein said multichannel reproducing apparatus is a stereo type apparatus.

14. The FM audio signal reproducing apparatus of claim 12, wherein said multichannel reproducing apparatus is a binaural type apparatus.

15. The FM audio signal reproducing apparatus of claim 12, wherein said multichannel reproducing apparatus is a bilingual type apparatus.

16. The FM audio signal reproducing apparatus of claim 12, wherein said multichannel reproducing apparatus includes three channels.

17. The FM audio signal reproducing apparatus of claim 12, wherein said multichannel reproducing apparatus includes four channels type.

* * * * *